United States Patent [19]

Osepchuk

[11] 4,421,968
[45] Dec. 20, 1983

[54] MICROWAVE OVEN HAVING ROTATING CONDUCTIVE RADIATORS

[75] Inventor: John M. Osepchuk, Concord, Mass.

[73] Assignee: Raytheon Company, Lexington, Mass.

[21] Appl. No.: 222,811

[22] Filed: Jan. 5, 1981

Related U.S. Application Data

[63] Continuation of Ser. No. 965,636, Dec. 1, 1978, abandoned.

[51] Int. Cl.³ .............................................. H05B 6/72
[52] U.S. Cl. ...................... 219/10.55 F; 219/10.55 R; 343/700 MS
[58] Field of Search .................. 219/10.55 F, 10.55 B, 219/10.55 R, 10.55 E; 333/238, 246; 343/700 MS, 846, 848, 849

[56] References Cited

U.S. PATENT DOCUMENTS

| | | | |
|---|---|---|---|
| 2,937,259 | 5/1960 | De Bell, Jr. ................ | 219/10.55 F |
| 3,221,132 | 11/1965 | Staats ............................ | 219/10.55 F |
| 3,436,507 | 4/1969 | Puschner ...................... | 219/10.55 F |
| 3,761,936 | 9/1973 | Archer et al. ..................... | 333/238 |
| 3,921,177 | 11/1975 | Munson .............................. | 333/238 |
| 3,971,032 | 7/1976 | Munson et al. .............. | 343/700 MS |
| 4,053,730 | 10/1977 | Baron et al. ................. | 219/10.55 F |
| 4,110,712 | 8/1978 | Morris ................................ | 333/238 |
| 4,125,839 | 11/1978 | Kaloi ............................ | 343/700 MS |
| 4,131,894 | 12/1978 | Schiavone .......................... | 333/246 |
| 4,132,993 | 1/1979 | Ehrhardt et al. ................... | 343/848 |
| 4,165,454 | 8/1979 | Carlsson et al. ............. | 219/10.55 F |
| 4,176,266 | 11/1979 | Kaneko ......................... | 219/10.55 F |

FOREIGN PATENT DOCUMENTS

| | | | |
|---|---|---|---|
| 2757710 | 6/1978 | Fed. Rep. of Germany ... | 219/10.55 E |
| 1543980 | 4/1979 | United Kingdom ......... | 219/10.55 F |

Primary Examiner—D. A. Reynolds
Assistant Examiner—Philip H. Leung
Attorney, Agent, or Firm—William R. Clark; Joseph D. Pannone; Herbert W. Arnold

[57] ABSTRACT

A microwave oven having a rotating radiator supported on a conductor extending through an aperture in a wall of the oven. The radiator is made up of a plurality of separate radiating elements supplied with microwave energy from said conductor via separate strip lines. A conductor of each of the strip lines rotates with the radiator and with respect to a ground plane which is common to all the strip lines and is formed by the wall of the oven containing the aperture. The radiating elements simultaneously radiate separate patterns into the oven.

3 Claims, 7 Drawing Figures

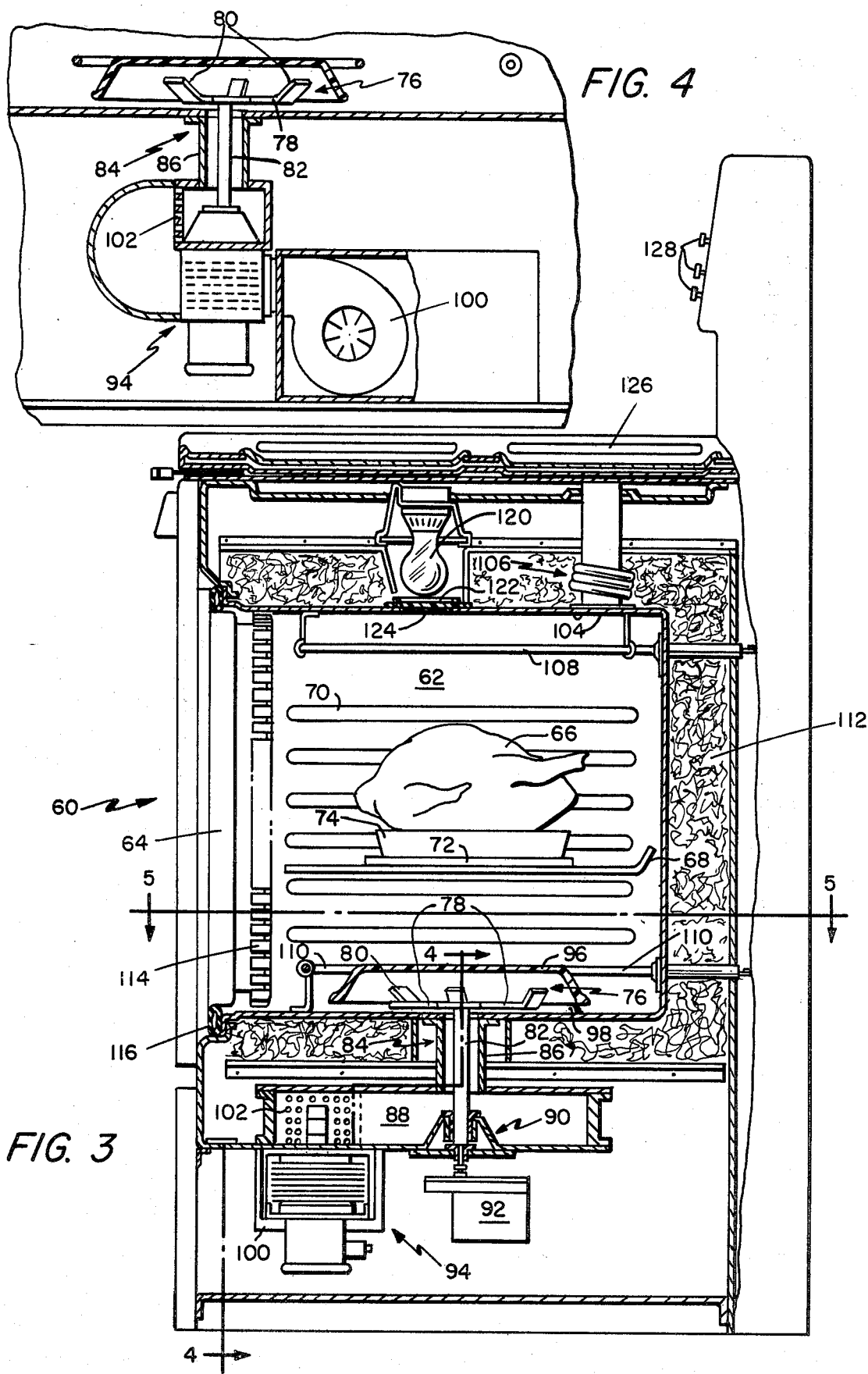

MICROWAVE OVEN HAVING ROTATING CONDUCTIVE RADIATORS

CROSS-REFERENCE TO RELATED CASES

This is a continuation of application Ser. No. 965,636, filed Dec. 1, 1978, now abandoned.

BACKGROUND OF THE INVENTION

Microwave ovens have been produced in which a radiator provides a multi-mode pattern in the oven and such patterns have been stirred by reflective mode stirrers. However, heating patterns in such ovens have generally been non-uniform so that food bodies placed in the oven have to be periodically rotated or moved in the oven to produce uniform heating thereof.

In addition while separate radiator patterns from different radiating apertures supplied from a rotating plenum have been used, such radiating systems are relatively expensive.

SUMMARY OF THE INVENTION

In accordance with this invention there is disclosed a microwave oven having a plurality of separate radiating elements supplied from a common region by transmission lines comprising conductive members spaced from a common ground plane such as adjacent regions of a wall of the oven. More specifically radiating elements are fed by separate micro-strip transmission lines formed by conductive strips spaced from the oven wall and using the oven wall as the ground plane. Preferably the conductive strips are electrically coupled to a conductor extending through a ground plane aperture formed by the wall of the oven. The electrical conductors all move with respect to the oven wall. The oven wall thus acts as a common ground plane.

The radiating elements are preferably formed as extensions of the conductors and the extension, extend at an angle with respect to the ground plane region of the oven wall. While a large number of different structures may be used for the radiating elements including elements having portions extending parallel to the ground plane and elements extending at different directions to the ground plane, the radiating elements preferably comprise portions spaced at different distances and directions from the axis of rotation of the radiating structure. In addition, while the axis of rotation of the structure is preferably perpendicular to the wall of the oven it may, if desired, be at an angle with respect thereto which is other than perpendicular.

In accordance with this invention the microwave energy may be supplied to the radiator from a source outside the oven cavity. More specifically, a waveguide fed by a magnetron may have a conductor extend from the radiator through the oven wall into the waveguide. Means such as a motor positioned outside the waveguide may be used for rotating the conductor and the radiator may be supported from the conductor. Alternatively the conductor supporting the radiator may be the output structure of a magnetron extending into the oven through an aperture in the oven wall.

While the lengths of the radiating structure strip transmission lines and the radiating element fed thereby may be of any desired valve, the portions thereof extending in any particular direction are preferably less than the free space wavelength of the microwave energy in the cavity.

In accordance with another aspect of the invention the radiating structure may be incorporated in a conventional microwave oven having electrical heating elements positioned therein. More specifically, heating elements such as calrod units may be positioned, for example, adjacent the bottom wall of the oven surrounding a radiating structure fed with microwave energy from a waveguide through a coaxial line. Alternatively, heating may be supplied by convection hot air in which a heating element or a gas burner external to the oven may heat vapor which is recirculated through the oven.

In accordance with this invention the radiating structure may be supported by a solid dielectric such as plastic if no additional conventional heating is used, or may be supported by ceramic if additional heating by calrod units or gas heaters positioned outside the oven are used.

BRIEF DESCRIPTION OF THE DRAWINGS

Other and further objects and advantages of the invention will be apparent as the description thereof progresses reference being had to the accompanying drawings wherein:

FIG. 3 illustrates embodiment of the invention wherein auxilliary heating elements such as bake and/or broiler units are incorporated in the oven;

FIG. 4 is a partial sectional view of the oven of FIG. 3 taken along line 4—4 of FIG. 3;

DESCRIPTION OF THE PREFERRED EMBODIMENT

Figure 1:
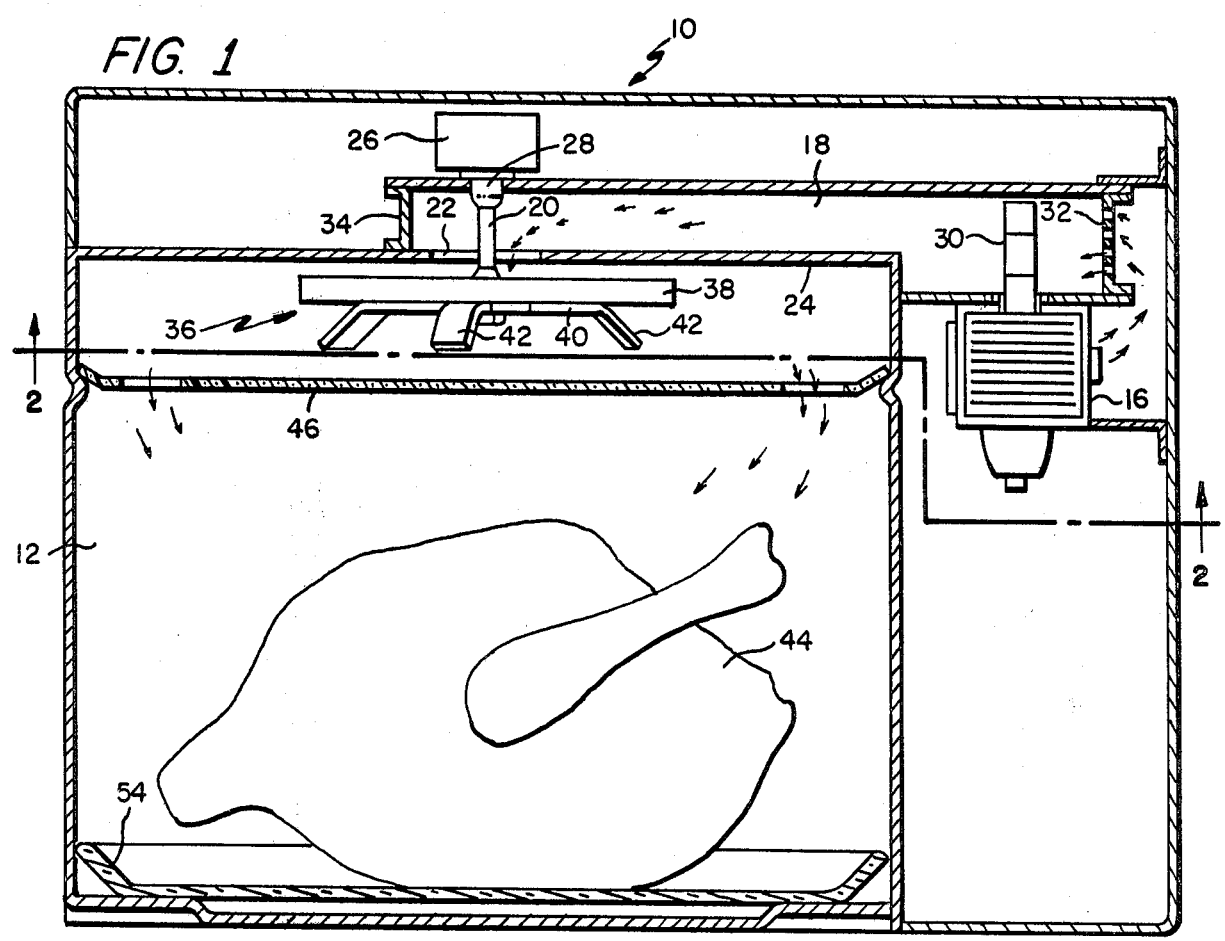
FIG. 1 illustrates a vertical sectional view of a microwave oven embodying the invention taken along line 1—1 of FIG. 2.
Figure 2:
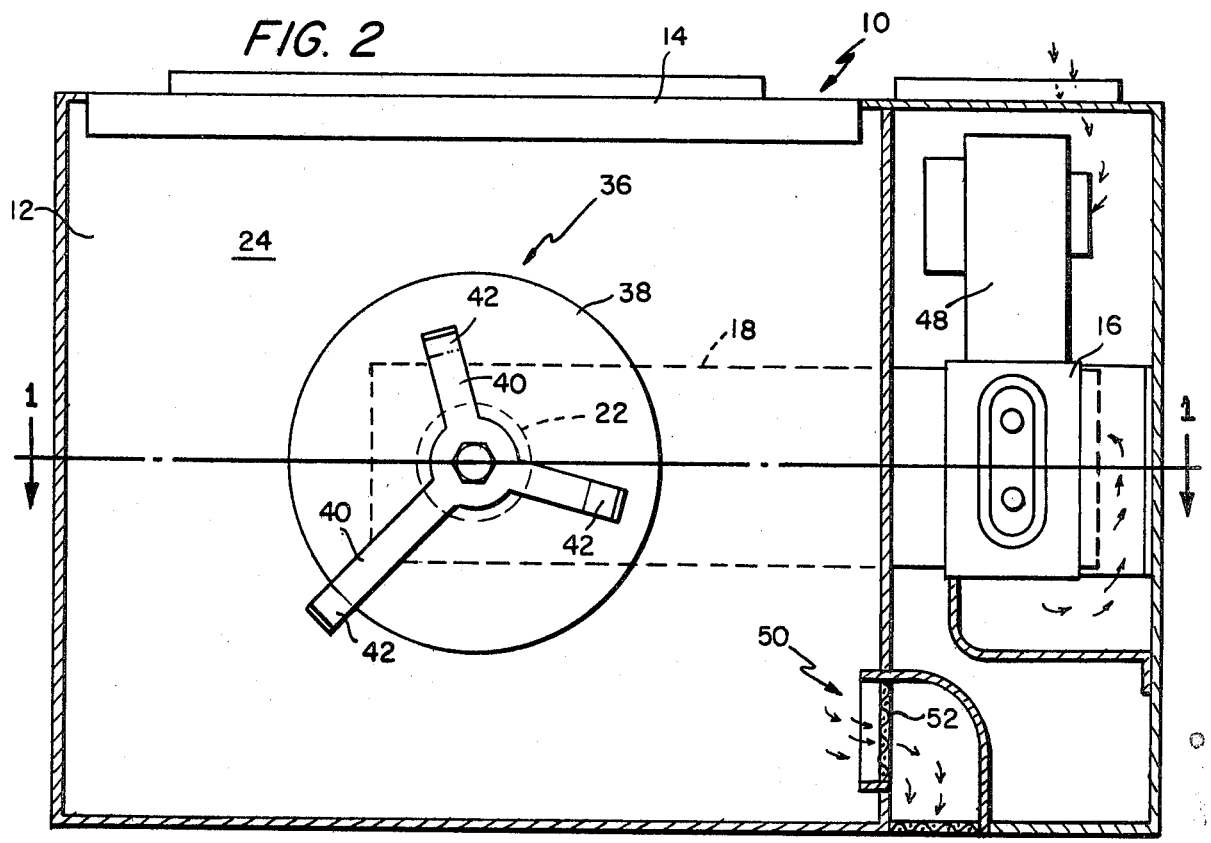
FIG. 2 illustrates a transverse sectional view of the oven of FIG. 1 taken along line 2—2 of FIG. 1.
Figure 5:
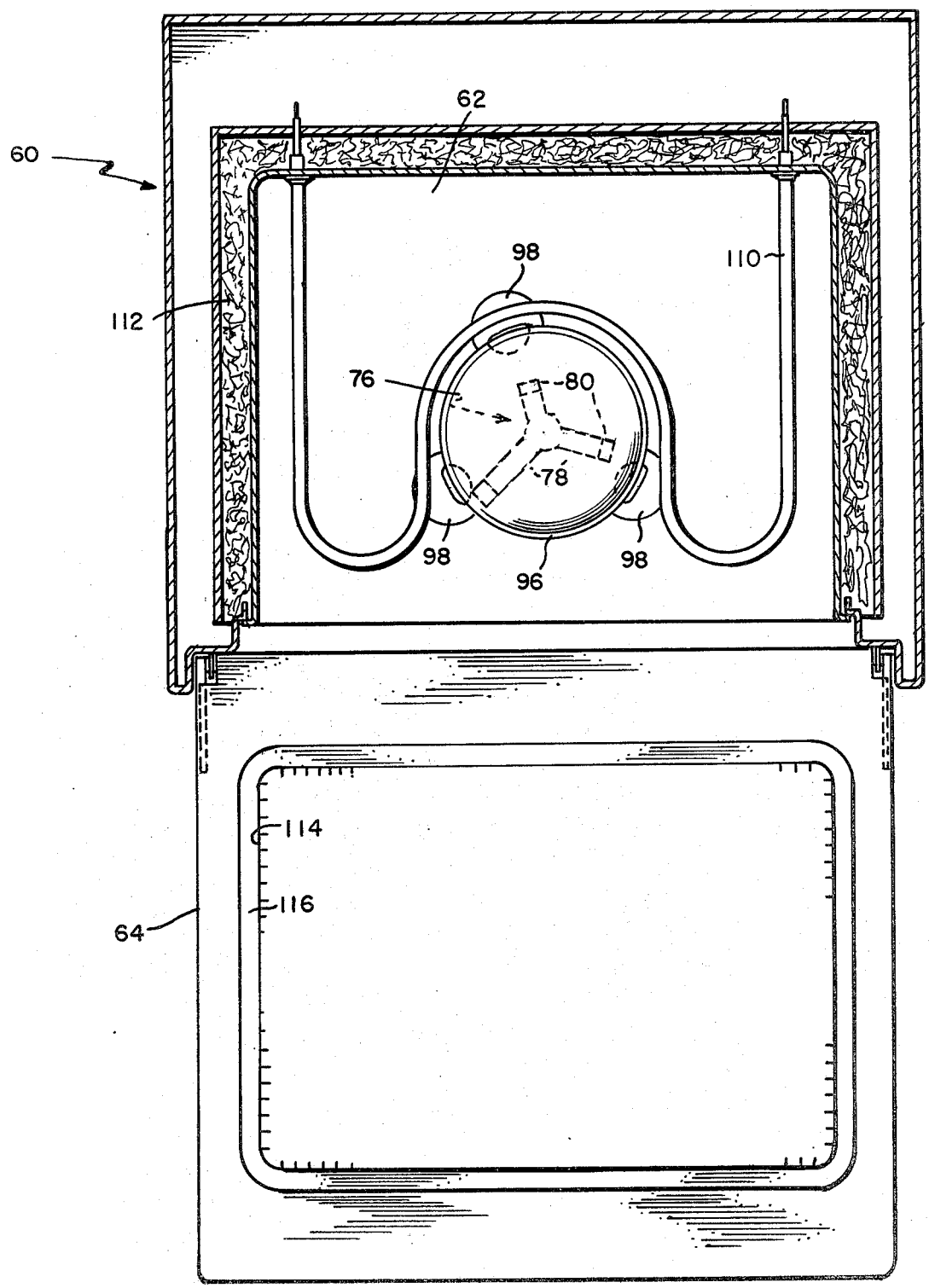
FIG. 5 illustrates a transverse sectional view of the oven with door open taken along line 5—5 of FIG. 3.

Referring now to FIGS. 1 and 2 there is shown a microwave oven 10 comprising an enclosure 12 made, for example, of conductive material such as stainless steel or steel coated with porcelain. Enclosure 12 has an access opening closed by a door 14 which is sealed, to the walls of the enclosure 12, by a microwave choke type seal shown, for example, in U.S. Pat. No. 3,767,884. Mirowave energy, supplied by a source such as a magnetron 16, is fed through a waveguide 18 to a conductive element 20 which extends through an aperture 22 in the lower wall of waveguide 18 and the upper wall 24 of enclosure 12. The upper end of conductor 20, which is in waveguide 18 is attached to a motor 26 by a dielectric coupling member 28 which extends through an aperture in the upper surface of waveguide 18 to the motor 26. The size of the aperture is substantially less than one-half wavelength of the microwave energy in dielectric coupling member 28 and a quarter wavelength choke (not shown) may surround member 28 between waveguide 18 and motor 26. Dielectric coupling member 28 is rotated by a motor 26 and thereby rotates conductor 20.

Energy from magnetron 16 having a frequency of, for example, 2.45 KmH is propagated from magnetron output probe 30 through waveguide 18 and conductor 20 into enclosure 12 with impedance matching of waveguide 18 to magnetron 16 being selected by the positioning waveguide shorting end plate 32 to permit magnetron 16 to operate at maximum efficiency in accordance with well-known practice. The other end of waveguide 18 which adjacent to which conductor 20 extends into waveguide 18 is impedance matched to conductor 20 by selecting the position of waveguide shorting plate 34. The position of plate 34 is selected to match the impedance presented in waveguide 18 through conductor 20 from a radiating structure 36 supported in enclosure 12 by conductor 20. While any desired impedance matching structures may be selected by selecting the position of plates 32 and 34 they are preferably chosen so that the magnetron, operating for example, with 4,000 volts anode to cathode potential will provide microwave power at high efficiency to the radiating structure 36 in enclosure 12.

Radiating structure 36 comprises a dielectric support plate 38 which supports flat strips of metal 40 which may be, for example, between one quarter inch and one inch in width and which extend radially outwardly from conductor 20 and electrically connected thereto. While in this embodiment of the invention three strips 40 are illustrated, any desired number can be used. Preferably, while, the lengths of strips 40 are different and the angular separation between adjacent strips 40 is the same, different separation angles could be used.

The outer end of strips 40 are bent downwardly into radiating elements 42 of conductive material which act as separate radiators. While the length of such radiating elements 42 is preferably substantially a quarter wavelength at the frequency of magnetron 16; however, radiators which are substantially multiples of one quarter wavelength long could be used.

The spacing of strips 40 from the top wall 24 of enclosure 12 is preferably selected to produce micro-strip transmission lines wherein the impedance of each line is between 75 and 300 ohms so that their junction at conductor 20, an impedance of between 25 and 100 ohms, is presented. Preferably the widths of strips 40 are in the range of 0.25" to 1" and their spacing from upper wall 24 is less than their average width. Thus, when conductor 20 is rotated by motor 26, the individual strips 40 and the radiating elements 42 fed thereby rotate about an axis through conductor 20, with dielectric member 28 providing a bearing against the upper wall of waveguide 18 to prevent sidewise motion of the radiator 36.

The portions of strips 40 together with the adjacent portion of the upper wall 24 act as individual micro-strip transmission lines and the aperture 22 together with the conductor 20 act as a coaxial transition fed from the waveguide 18 into the enclosure 12 with microwave energy propagating radially outwardly along the micro-strip transmission lines while the wall 24 acts as the ground plane for the micro-strip transmission lines and with the individual strips 40 acting as movable conductive members of the micro-strip transmission lines acting in connection with the fixed ground plane 24. This invention discloses the discovery that the major portions of the microwave energy from magnetron 16 may be thus radiated from the radiating elements 42 as separated radiation patterns with each pattern having at all times a substantial component directed downwardly toward a load such as a food body 44 positioned in enclosure 12. Rotation of structure 36 can thus be made to produce many addition modes in enclosure 12 and hence a heating pattern, substantially without cold spots, so that food body 44 need not be turned or changed in position during a cooking cycle.

In addition, since a substantial portion of the microwave energy upon being radiated from the elements 42 first impinges on the food body 44 prior to reflection from the walls of enclosure 12 efficient coupling of microwave energy from the magnetron 16 into the food body 44 can occur.

The radiating structure 36 simultaneously radiates three separate directing patterns into the oven having different polarizations positioned at different distances from the axis of rotation of the radiating structure 36 so that different toroidal radiation patterns are formed in the oven with preferably larger amounts of microwave energy being directed toward the central regions. While some radiation directly from the members 40 is encountered, by selecting the spacing between members 40 and wall 24 to have an effective electrical distance which is substantially less than one quarter of a wavelength of the frequency of magnetron 16, the major portion of the microwave energy fed to enclosure 12 from magnetron 16 will be radiated from radiating elements 42.

Thus, it may be seen that a relatively inexpensive radiating structure may be provided in accordance with this invention which will radiate peak powers in excess of one kilowatt into an oven while providing an improved heating pattern within the oven.

Conductive radiating elements 42 are protected by dielectric shield member 46, which is positioned in enclosure 12 below radiating structure 36 to prevent accidental contact of the radiating structure 36 by dishes or food bodies as they are being positioned in the oven.

A blower structure 48 may blow air across the magnetron 16 to cool the magnetron and may blow a portion of the air in through apertures in end plate 32 and thence into the oven via aperture 22 and through apertures in dielectric shield 46 so that cooking vapors do not condense in the waveguide or on the radiating structure. Air thus blown into the oven may be extracted therefrom through an aperture 50 covered by a screen 52 which prevents microwave energy from leaking out of the oven in accordance with well-known practice.

While an energy load such as a glass plate 54 may be positioned in the bottom of the oven to support the food body 44, and to provide a minimum load if the oven is energized when no food body is positioned therein, such a plate 54 need not necessarily be used to prevent excess reflections of microwave energy back to magnetron 16. Rather the micro-strip members 40 may have different lengths chosen such that the microwave energy reflected by enclosure 12 to elements 42 is transmitted to conductor 20 in different phases which produces substantial cancellation at conductor 20 thereby reducing the amount of microwave energy reflected back to magnetron 16 from the enclosure 12 when light loads are being heated.

DESCRIPTION OF AN ALTERNATE EMBODIMENT

Referring now to FIGS. 3 and 4 there is shown an alternate embodiment of the invention wherein a stove 60 has a conductive enclosure 62 with a door 64 through which a food body 66 may be positioned in the enclosure 62. Body 66 may be supported, for example, on a metal rack 68 whose position may be adjusted by selecting the level of different protuberances 70 on the side walls of the enclosure 62 supporting the rack 68. A ceramic plate 72 is positioned in the middle of the rack and a dish 74, which is preferably transparent to microwave energy, rests on plate 72 and supports the food body 66.

A radiating structure 76 positioned adjacent the bottom of the oven surface comprises a plurality of metal conductive members 78 connected respectively to a plurality of metal radiating members 80 which may be extensions of conductive member 78. A central conductor 82 of a coaxial line 84 is connected to conductor members 78 which extend radially outwardly to radiating members 80. Coaxial line 84 extends through the bottom wall of the enclosure 62 to a waveguide 88. Conductor 82 extends through waveguide 88 where it is supported by a dielectric bearing and conductive choke assembly 90. An extension of conductor 82 which extends below waveguide 88, is rotated by a motor 92 to rotate radiator 76.

Microwave energy at a frequency of 2.45 KMhz is generated by a magnetron 94 and is propagated through waveguide 88 and coaxial line 84, to stripline conductive members 78 which extend radially outwardly from conductor 82 at different radial angles parallel to the bottom wall of enclosure 62 to radiating elements 80. Conductive members 78 are preferably in a plane spaced from the conductive stationary bottom wall of enclosure 62 by a distance which is less than an effective quarter wavelength of the frequency of the microwave energy in enclosure 62. Conductive members 78 are preferably flat strips whose width is from 0.2 inches to 1 inch forming separate transmission lines whose impedances are determined by their effective electrical spacing from said bottom wall of enclosure 62. The outer ends of the conductive members 78 may be bent upwardly at obtuse angles of, for example, 45 degrees to form the radiation elements 80, elements 80 may be, for example, substantially one quarter wavelength long and directively radiate separate patterns toward the food body 66. As the radiator 76 is rotated by motor 92 the radiation patterns from radiating elements 80 form toroidal patterns whose axes lie along the axis of rotation of the structure 76. Due to the different distances of the radiating elements from said axis of rotation and the angles at which the radiating elements lie with respect to the axis of rotation, the toroidal radiation patterns are of different sizes and/or shapes. By selecting the distances of elements 80 favor said axis of rotation, and their angles with respect thereto, the average intensity of the heating pattern in the centers of the toroids may be selected. Preferably the average heating pattern intensity is somewhat greater in the center than toward the oven side walls.

A ceramic cover 96 is positioned over structure 76 spaced therefrom and accurately positioned by being supported on bumps 98 formed in the bottom wall of enclosure 62 so that the radiator 76 is protected from spills of food or damage from dishes which might otherwise be dropped on the radiator 76. Air from a blower 100 is blown through the fins of magnetron 94 to cool the anode and then through apertures 102 in the side wall of waveguide 88 into waveguide 88 and into the enclosure 62 through coaxial line 84 and under the edges of cover 96 between bumps 98. Air entering the oven is allowed to escape through a screened exhaust vent 104 in the upper wall of the oven connected to a pyrolitic cleaning element 106 so that oven vapors are pyrolized before being exhausted into the room.

Auxilliary heating is provided for the oven by broiler calrod unit 108 supported adjacent the upper wall of the oven and by a baking calrod unit 110 surrounding the dish 74 spaced therefrom and supported from the floor of the oven. Thermal insulation 112 is positioned around the oven to prevent loss of thermal energy. Preferably, blower 100 operates whenever either the conventional heat is energized or the microwave heat is energized so that air is blowing by cover 96 to maintain the cover below its softening temperature of 700° F. or 800° F. even though the calrod unit 110 spaced therefrom by a distance of an inch or so may be heated to temperatures above 1,000° F.

In accordance with this invention, door 64 has a microwave choke 114 formed thereon which may be, for example, of the type illustrated in U.S. Pat. No. 3,767,884. A high temperature vapor seal 116 is positioned outside the choke region so that cooking vapors are exhausted to the room only through vent 104. A latch 118 prevents opening of door 64 during operation in accordance with well-known practice.

Auxilliary equipment such as a light 120 above the top wall of the oven may be positioned to illuminate the oven through a translucent ceramic 122 and a microwave impervious screen 124. Top burners 126 and associated controls may also be provided.

In accordance with this invention there is disclosed the discovery that the directive heating pattern of applicant's radiator 76 may be used in combination with conventional heating provided by the calrod units to reduce the cooking time and to produce any desired degree of cooking and/or surface browning of a a food body.

DESCRIPTION OF A FURTHER EMBODIMENT

Figure 6:
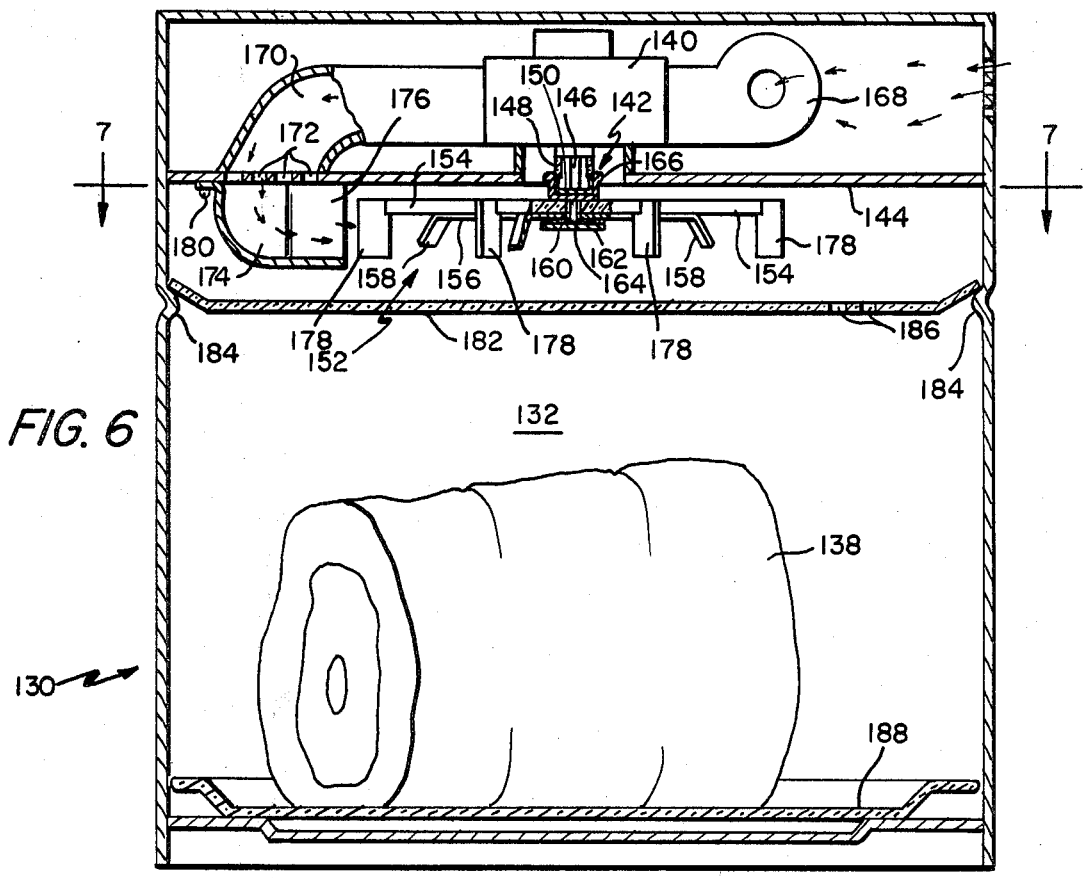
FIG. 6 illustrates a vertical sectional view taken along line 6—6 of FIG. 1 of an alternative embodiment of the invention wherein the radiating structure is supported directly from a magnetron output structure in the oven and is rotated by air directed against portions of the radiating structure.
Figure 7:
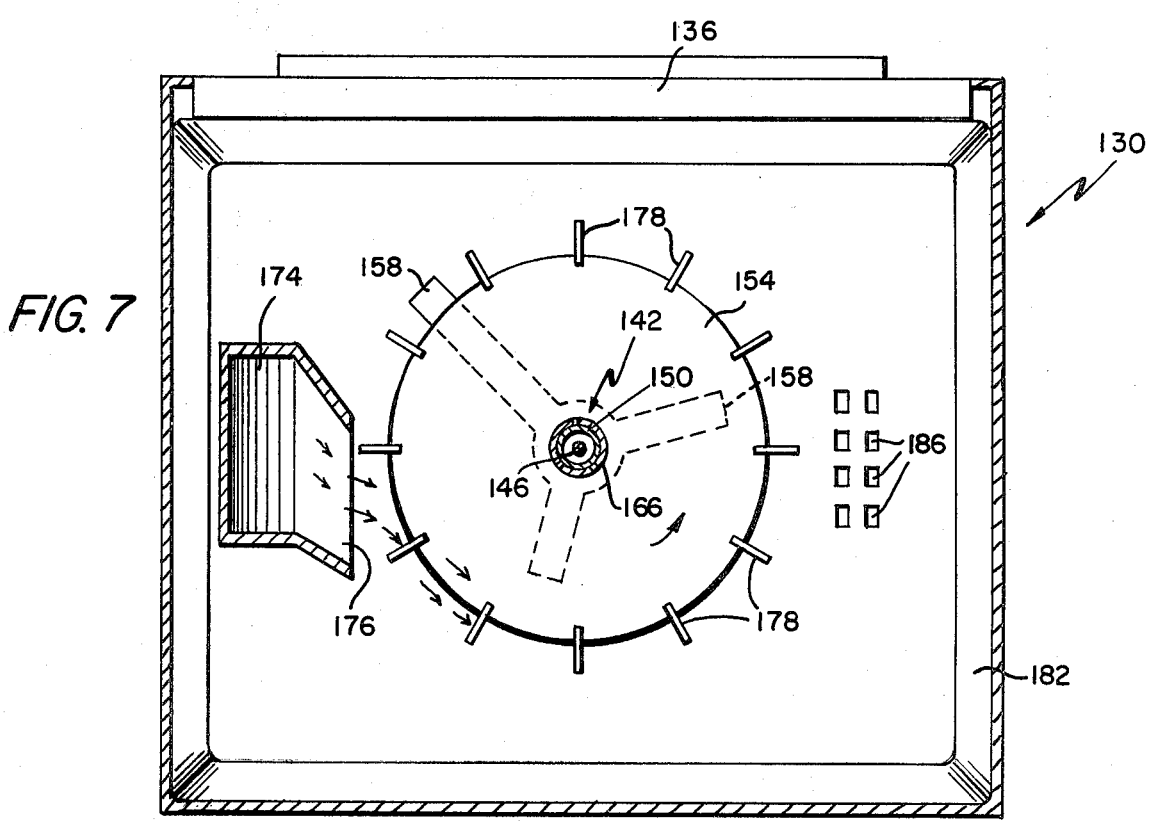
FIG. 7 illustrates a transverse sectional view of the embodiment of FIG. 6 taken along line 7—7 of FIG. 6.

Referring now to FIGS. 6 and 7 there is shown a further embodiment of the invention wherein an oven 130 comprises a conductive enclosure 132 having a door 136 by means of which a food body 138 may be positioned within the enclosure 132. A source of microwave energy having a frequency of 2.45 KMhz is provided by magnetron 140 whose output 142 is inserted through the upper wall 144 of enclosure 132. Output 142 comprises a conductor 146 inside a ceramic cylinder 148 and connected to an output end cap 150 in accordance with well-known practice.

In accordance with this invention a radiating structure 152 is supported in enclosure 132 from output cap 150. Radiating structure 152 comprises a dielectric plate 154 supporting a plurality of conductive members 156 on its lower surface which feed metal radiating elements 158. Conductive members 156 are connected together at their inner ends and rest on a thin dielectric washer 160 which in turn rests on a metalic washer 162 which is attached to a metal conductor 164. Conductor 164 extends through dielectric plate 154 and is attached by a spring clip 166 to a conductive cap 150 of the output structure 142. As a result, disc 154 carrying conductors 156 and radiating elements 158 is free to rotate about conductor 164. Effective electrical conduction between output cap 150 and metal conductive members 156 occurs since the dielectric washer 160 acts as a low impedance capacitive coupler at microwave frequencies. If desired, a metal to metal contact may be used between the support washer 162 and the members 156; however, better wear characteristics can be achieved if dielectric material such as mylar or nylon is used for thin bearing washer 160.

Air from a blower 168 is blown through fins attached to the anode of magnetron 140 and thence via a duct 170 and apertures 172 in the upper wall 144 of enclosure 132 to a plenum 174 having a nozzle 176 which directs the air tangentially against the periphery of dielectric disc 154. The air impinges on a plurality of dielectric paddles 178 attached to the rim of disc 154 to rotate disc 154 about conductive member 164. Plenum 174 is shown as attached to upper wall 144, for example, by screws 180. However, if desired, it could be formed integral with a dielectric cover member 182 which is supported on projections 184 below radiating structure 152 and protects the radiating structure. The air passes through apertures 186 in cover 182 into the oven enclosure 132 and thence out via a screen vent (not shown) so that oven cooking vapors may be vented from the oven. The conductive members 156 are flat strips lying in a plane spaced parallel to the upper wall 144 by a distance which is less than one quarter of an effective electrical wavelength of the microwave energy and the width of said members 156 are selected to provide an impedance match to the output structure 142 of magnetron 140 which will cause the magnetron to operate with optimum efficiency. For example, said spacing is preferably less than their spacing from wall 144.

The food body 138, as illustrated herein, rests on a glass tray 188. However, if desired, it may be supported on a metal rack similar to the embodiments of FIG. 4 and additional heat from hot air, or from a browning calrod unit positioned in the oven, could be used.

This completes the description of the embodiments of the invention illustrated herein; however, many modifications thereof will occur to persons skilled in the art without departing from the spirit and scope of this invention. For example, a wide variety of sizes, shapes, and orientations of the radiating elements could be used, more than three micro-strip lines and radiating elements could be used. Accordingly it is contemplated that this invention be not limited to the particular embodiments illustrated herein except as defined be the appended claims.

What is claimed is:

1. A microwave oven comprising:
   a conductive enclosure;
   a waveguide positioned outside said enclosure adjacent to a horizontal wall of said enclosure;
   a magnetron for energizing said waveguide with microwave energy;
   an aperture in said wall communicating from said waveguide into said enclosure;
   an antenna probe extending vertically through said aperture for coupling said microwave energy from said waveguide into said enclosure;
   a plurality of microwave radiating elements positioned in said enclosure;
   transmission lines for coupling said microwave energy from said antenna probe to said microwave radiating elements, said transmission lines comprising conductive strips connected to said antenna probe at a common junction, each of said conductive strips extending radially from said antenna probe and supporting one of said radiating elements, each of said conductive strips being parallel to said wall and spaced less than a quarter wavelength of said microwave energy from said wall wherein said wall functions as a ground plane substantially limiting microwave radiation from said conductive strips; and
   means for rotating said antenna probe about its axis wherein said conductive strips move with respect to adjacent portions of said wall to move said radiating elements in circular paths around said antenna probe.

2. The microwave oven recited in claim 1 wherein the effective electrical distance between each radiating element and said probe antenna is an integral number of quarter wavelengths at the frequency of said microwave energy.

3. The oven recited in claim 1 wherein said radiating elements are at different distances from said antenna probe.

* * * * *